United States Patent Office 2,855,432
Patented Oct. 7, 1958

2,855,432
PROCESS FOR THE PRODUCTION OF THE GLYCOL ESTER OF TEREPHTHALIC ACID SUITABLE FOR POLYMERIZATION

Hans Binder, Rottweil (Neckar), Germany, assignor to Rottweiler Kunstseidefabrik Aktiengesellschaft, Rottweil (Neckar), a corporation of Germany No Drawing. Application February 28, 1956
Serial No. 568,150

Claims priority, application Germany March 4, 1955

10 Claims. (Cl. 260—475)

This invention relates to the preparation of a terephthalic acid glycol ester used in the production of polyethylene terephthalate, and it particularly relates to the production of the bis-glycol ester.

Heretofore, this ester has generally been obtained, not through the direct esterification of the glycol with terephthalic acid, but through the conversion of the esters of the lower aliphatic alcohols of the terephthalic acid, usually the dimethyl esters, by means of ethylene glycol.

One of the main reasons for generally using this type of process heretofore, was due to the fact that terephthalic acid, itself, is highly insoluble and is, therefore, extremely difficult to purify. Since the presence of even small amounts of impurities has a highly deleterious effect on the resultant polymer, it has, therefore, not been considered feasible to directly esterify the terephthalic acid. The dimethyl ester, having good solubility and sublimability, and being more easily purified, therefore, was used instead.

Furthermore, the esterification of the terephthalic acid with methanol takes place completely and with no side reactions, whereas the direct esterification of the terephthalic acid with glycol, which is a divalent alcohol, often results in the formation of harmful by-products due to the side reactions of the divalent glycol.

In addition to the above, the trans-esterification, especially where catalysts are used, takes place much more quickly than the direct esterification of the terephthalic acid with glycol. However, it must be noted that even though this transesterification is more rapid in itself, the production and purification of the dimethyl ester, which is necessary in this process, results in a total processing time which is often quite prolonged.

All of the above-mentioned processes require several steps for the production of the corresponding terephthalic acid derivatives used for the glycol esterification. This generally results in a loss of time which could be saved if it were possible to use an efficient, direct esterification method. Such method must, in the first place, be rapid enough and, in the second place, must yield a product of a sufficient degree of purity to permit its conversion to a highly valuable polymer, without additional purification steps.

It is, therefore, one object of the present invention to provide a single process for preparing terephthalic acid glycol esters whereby, not only is the esterification product easily recovered, but whereby, at the same time, it is highly purified.

Very exhaustive tests in regard to the direct esterification of glycol with terephthalic acid have indicated that, in no case, is a uniform esterification product obtained, whether the process is carried out at atmospheric pressure, at lower than atmospheric pressure with continuous distillation of the water formed in the reaction, or at higher than atmospheric pressure. The following products are invariably formed, even with varying amounts of excess glycol, although the proportions thereof might vary in accordance with the reaction conditions:

(1) Terephthalic acid-bis-glycol ester (capable of being easily crystallized and having a melting point of 110.5° C.).

(2) Terephthalic acid-mono-glycol ester (crystalline and having a sintering temperature of 178° C.).

(3) A first condensation product of 3 mole glycol and 2 mole terephthalic acid (finely crystalline and having a melting point of 160–162° C.).

(4) A second condensation product of 4 mole glycol and 3 mole terephthalic acid (finely crystalline and having a melting point of 186° C.).

(5) Diglycol ether ester of 2 mole terephthalic acid-mono-glycol ester (oily).

In the following description, the term bis-glycol ester is used to designate the neutral glycol ester of terephthalic acid with one glycol group per carboxyl group, while the diglycol esters, which are esters of diglycol ether, are termed simply "diglycol."

The most important solubility properties of the above five materials are set forth in the following Table 1 wherein they are identified by their above listed numbers.

TABLE 1

| Solubility in— | 1 | 2 | 3 | 4 | 5 |
|---|---|---|---|---|---|
| cold water | slight | poor | insoluble | insoluble | insoluble. |
| warm water | good | good | poor | almost insoluble. | slight. |
| warm acetone | do | almost insoluble. | insoluble | soluble | good. |
| dioxane | do | do | do | do | Do. |
| ether | do | insoluble | do | insoluble | Do. |
| hot tetrachloroethane | do | slight | soluble | soluble | very good. |
| dichlorethane | do | do | do | do | Do. |
| chloroform | do | do | do | do | Do. |
| Methanol | do | do | do | do | Do. |

It has, heretofore, been proposed to use acid chlorides or, more specifically, ester chlorides, in place of the free acids in order to decrease the reaction time. On the other hand, it has also been proposed to react alkali salts of dibasic acids with aliphatic dihalogen compounds, without separating out the monomeric bis-ester. It has, further, been proposed to substitute the diphenoxy alkane 4,4'-dicarboxylic acid, or its chloride or methyl ester, for the terephthalic acid used in the transesterification process, in which process the reaction products of the first condensation step are intermixed with the starting materials.

In accordance with the reaction conditions, there may result, in addition to or in place of one of the above compounds, not only free diglycol and free triglycol esters, but also other diglycol esters or mixed glycol-diglycol esters of the terephthalic acid. Terephthalic acid-bis-diglycol ester (oily, slowly solidifying), terephthalic acid-glycol-diglycol ester (oily), and terephthalic acid-mono-diglycol ester (half solidified and having a melting point of about 100° C.), may also be produced. The latter three substances, which may also be solidified during the synthesis, are characterized by good water solubility.

While the first four glycol esters listed above are all capable of forming highly valuable polymers, the presence of terephthalic acid ester, which contains the diglycol radical, is very deleterious to the polymerization process.

Although the diglycol esters of terephthalic acid may be polymerized at higher temperatures, such polymers, which have a waxy or glass-like appearance, are generally characterized by melting points of only about 110–125° C. As a result, threads formed therefrom are not stretchable and the products made from such threads have a generally net-like appearance. Furthermore, the diglycol group has an undesirable internal softening effect. Therefore, the presence of even a small percentage of diglycol-containing polymer is sufficient to deleteriously affect the valuable properties of the glycol ester polymers.

Even if the first four above-listed terephthalic acid glycol esters, of varying degrees of polymerization, are considered to be suitable for the formation of highly valuable polymerization products, they are still of different suitability for practical commercial use because of their insufficient purity.

The bis-glycol ester of the terephthalic acid is, by far, the most preferable because of its excellent ability to crystallize. Therefore, it is preferred to form this substance at the expense of other products formed during the reaction.

The mono-glycol ester, because of its acid character, has a special tendency to tenaciously retain inorganic impurities originating in the terephthalic acid, the catalysts or the treating apparatus. As regards the first and second condensation products, in the above list, their finely crystalline structure permits the retention not only of inorganic foreign substances, but also of the undesirable diglycol compounds from which they are extremely difficult to separate.

In order to influence the equilibrium between the various reaction products, it is possible to vary any of several factors such as the reaction temperature, the reaction time, the quantity of glycol used, the means for removal of the water formed during the reaction, and the type of catalyst used. Also of importance for this purpose is the method of separating the reaction products. This does not influence the equilibrium but permits the easy separation of the undesirable side reaction products or impurities. The favorable selection of these factors constitutes another important object of this invention.

If it is desired to omit the use of pressure in the process, the terephthalic acid can be heated in the presence of a corresponding quantity of glycol, or preferably with an excess thereof, since the formation of bis-glycol ester theoretically requires the proportion of 2 moles of glycol to 1 mole of terephthalic ester. A reflux apparatus that is heated with steam is preferably used. This type of apparatus permits the water vapors to pass but condenses the glycol vapors. By using this type of pressureless process the temperature can be varied by varying the pressure. The completion of the esterification process is indicated when the suspension of the terephthalic acid in the glycol changes to a clear solution. However, this does not necessarily indicate the final adjustment of the equilibrium has taken place.

Table 2, which follows, lists the various test results where the materials were heated at the boiling point of the glycol, i. e., to about 190° C. The temperature is constant in each case.

TABLE 2

| No. | Heating Time (hours) | Ratio of Actual to Theoretical Amount of Glycol Used | Final Precipitate Poured in Water Without Distillation | Glycol Distilled Before Pouring in Water, degrees | Yield of Bis-Glycol Ester (in Percent of Total Yield) | Yield of Mono-Glycol Ester (in Percent of Total Yield) | Yield of First and Second Condensation Products (in Percent of Total Yield) |
|---|---|---|---|---|---|---|---|
| 1 | 20 | 2.37 | + | | 58.6 | 14.2 | 27.2 |
| 2 | 40 | 2.37 | + | | 77.8 | 0.4 | 21.8 |
| 3 | 24 | 10 | + | | 83.7 | 11.0 | 5.3 |
| 4 | 48 | 10 | + | | 83.3 | 10.8 | 5.9 |
| 5 | 24 | 10 | + | 185–190 | 54.1 | 11.5 | 34.4 |
| 6 | 24 | 20 | + | 120 | 77.7 | 18.0 | 4.3 |

The yields listed above are gross yields because the diglycol ether ester of 2 mole terephthalic acid mono-glycol ester was not separated out, but instead was intermixed with the other products.

Table 2 clearly indicates that with a moderate excess of glycol, as the heating time increases, there is a relatively large increase in the formation of the desirable bis-glycol ester at the expense of the condensation products and especially at the expense of the mono-glycol ester. It is also apparent that the greater the excess of glycol, the shorter the heating time required to obtain the bis-glycol ester. A yield of over 83% of bis-glycol ester can be attained while the yield of mono-glycol ester is surprisingly only slightly decreased whereas the yield of the two condensation products is greatly decreased. The reason for this is apparently due to the fact that the two condensation products are easily converted, through heating with glycol, into the bis and mono-glycol esters. It has been determined, however, that even though the heating time is doubled where there is a large excess of glycol, there is little, if any, change in the yield. This indicates that if a large excess of glycol is used, the equilibrium state is attained after about 24 hours.

In the first four tests listed in Table 2, the entire mixture, with the excess of glycol, was poured into hot water. The bis and mono-glycol esters remained in solution but the condensation products precipitated out because of their poor solubility even in hot water. Upon cooling the filtrate, the bis and mono-glycol esters crystallized out in quite pure form. In this manner, therefore, it is seen that the reaction products can be separated in a most simple and direct way, while, at the same time, a purification takes place.

In tests 5 and 6 of Table 2, after the 24 hour heating period, the glycol excess was distilled off before the treatment with water. At the boiling point of the glycol in test 5, the reaction equilibrium was unfavorably shifted to cause a loss of bis-glycol ester in favor of the condensation products. However, where the temperature was maintained at 120°, as when using vacuum distillation, in test 6, this unfavorable shift of the equilibrium was greatly modified.

If it is desired to use a process without using high pressures, test 3 in Table 2, wherein a yield of 83.7% of bis-glycol ester is obtained, is the best process. This procedure can, therefore, be considered to be generally preferable.

Heretofore, a reaction time of 72 hours or more for the direct esterification of terephthalic acid with glycol, and a 54 hour heating time at the boiling point of the glycol when using the esterification of diphenoxy ethane 4,4′-dicarboxylic acid method, was considered to be excellent. Therefore, a method which requires a reaction time of about 24 hours or less for the direct production of this ester is obviously a great step forward in the art.

It has, furthermore, now been found that the esterification time when using the direct esterification method can be even further decreased if the reaction temperature in the autoclave is greatly increased beyond any previously used. The results of a number of tests, where the esterification temperature, the esterification time and the relative proportion between the terephthalic acid and the glycol were varied, are illustrated in Table 3. In this table, the term "bis" refers to the content of bis-glycol ester, the term "M" refers to mono-glycol ester, and the term "K" refers to the content of the condensation products.

TABLE 3

| Hrs. | | 220° | | | | 240° | | | | 250° | | | | 260° | | | |
|---|---|---|---|---|---|---|---|---|---|---|---|---|---|---|---|---|---|
| | | The percentage of the theoretical amount of glycol used | | | | | | | | | | | | | | | |
| | | 925% | 700% | 450% | 250% | 925% | 700% | 450% | 250% | 925% | 700% | 450% | 250% | 925% | 700% | 400% | 250% |
| ½ | Bis | | | | | | | | | 80.0 | 74.1 | 68.5 | 53.4 | 83.6 | 77.1 | 73.5 | 60.0 |
| | M | | | | | | | | | 10.5 | 12.1 | 15.4 | 17.1 | 8.2 | 10.9 | 11.8 | 12.5 |
| | K | | | | | | | | | 9.5 | 13.8 | 16.1 | 29.5 | 8.2 | 12.0 | 14.7 | 27.5 |
| 1 | Bis | | | | | 85.2 | | 74.5 | 57.3 | 85.0 | 81.1 | 77.1 | 59.6 | 86.0 | 81.6 | 77.3 | 61.0 |
| | M | | | | | 7.3 | | 9.8 | 17.5 | 7.3 | 7.6 | 8.8 | 14.4 | 7.0 | 7.5 | 8.3 | 11.9 |
| | K | | | | | 7.5 | 12.4 | 15.7 | 25.2 | 7.7 | 11.3 | 14.1 | 26.0 | 7.0 | 10.9 | 14.4 | 20.1 |
| 1½ | Bis | 57.8 | 53.8 | | | 85.8 | 81.6 | 75.7 | 62.0 | 86.0 | 83.2 | 77.2 | 61.2 | 87.2 | 83.9 | 77.7 | |
| | M | 24.9 | 28.5 | | | 7.3 | 8.3 | 8.9 | 13.3 | 6.7 | 6.9 | 8.2 | 13.0 | 5.8 | 6.0 | 7.6 | |
| | K | 17.3 | 17.7 | 18.0 | | 6.9 | 10.1 | 15.4 | 24.7 | 7.3 | 9.9 | 14.6 | 25.8 | 7.0 | 10.1 | 14.7 | 27.2 |
| 2 | Bis | 67.3 | 62.1 | | | 88.4 | 82.8 | 78.1 | 62.7 | 88.3 | 83.6 | 79.2 | 61.7 | 88.6 | 84.3 | 79.2 | 63.0 |
| | M | 17.7 | 22.6 | | | 4.9 | 7.5 | 7.8 | 12.7 | 4.7 | 6.0 | 7.6 | 12.4 | 4.4 | 6.0 | 7.2 | 9.8 |
| | K | 15.0 | 15.3 | 16.7 | 24.8 | 6.7 | 9.7 | 14.1 | 24.6 | 7.6 | 9.7 | 13.2 | 26.0 | 7.0 | 9.7 | 13.6 | 27.2 |
| 3 | Bis | 82.4 | 78.7 | 73.8 | 61.9 | 88.9 | 83.7 | 79.8 | 65.0 | | | | | | | | |
| | M | 8.6 | 8.9 | 11.8 | 12.9 | 4.4 | 7.0 | 6.9 | 19.3 | | | | | | | | |
| | K | 9.0 | 12.4 | 14.4 | 25.2 | 6.7 | 9.3 | 13.3 | 24.7 | | | | | | | | |

Before going into all the details of Table 3, it should be understood that the desired production of the bis-glycol ester can be obtained with a reaction time of 2 to 3 hours at a temperature of between about 240–260° C., with a yield of over 88%, if a glycol excess of about 900% of the theoretical amount is used. The mono-glycol ester and the condensation products, however, retain their corresponding proportion.

It should also be understood that the dehydration of the glycol to diglycol ether and to acetylaldehyde increases as the temperature increases, especially in an acid medium. Therefore, there are larger values with an increasing excess of the glycol. There is also, at the same time, an increase in the amount of diglycol esters in view of the proven fact that the esterification speed of the diglycol is higher than that of the glycol. The formation of the diglycol at any given temperature is, furthermore, dependent on the materials used and on the materials from which the treating apparatus is constructed. For example, it is higher when the apparatus is constructed of polished iron than when it is constructed of stainless steel.

In order to obtain a short reaction time and a high yield of bis-glycol ester, it is necessary to use high temperatures and a large amount of glycol, while, on the other hand, these same conditions result in the formation of the undesirable diglycol esters. This provides a conflict. In order to obtain the maximum advantages of this process, therefore, it has been found that by using a quantity of glycol which is about 7.25–9 times as great as that of the theoretical value and by initially adding only an amount of glycol corresponding to the theoretical amount; and, thereafter, increasing it up to the proportion of about 2 moles of glycol to 1 mole of terephthalic acid, good results are obtained. In this process, after a predetermined initial interval, before complete esterification has taken place, the water and steam which has so far been formed by the reaction, is removed, with or without first cooling to a point which is under the boiling point of the glycol; then the remainder of the glycol, which has first been preheated is added in the autoclave, after which further heating takes place. By this process there is not only a decrease of the diglycol portion to about one-fifth, but there is also a decrease of the diglycol ether ester, which, because of its relative insolubility in water, is otherwise much more difficult to separate than the water-soluble diglycol ester.

The following example is provided merely to illustrate the present invention without being intended to serve as any limitation thereof.

*Example*

In an agitator autoclave constructed of stainless steel, 160 g. of relatively impure terephthalic acid are heated together with 120 g. of ethylene glycol, for about 1½ hours, at a temperature of about 240° C. After about one hour of continuous heating, without interrupting the heating, the water formed by the reaction is evaporated out. Thereafter, 955 g. of glycol, which has been previously heated to 180° C. are inserted into the autoclave, and a further heating at about 220° C. takes place for about one hour.

The reaction product in the autoclave is, thereafter, cooled to 125° C. and at this temperature the excess glycol is vacuum-distilled off. The remaining liquid mass is then poured into two liters of water at 80° C. and the mixture is then cooled to about 50° C.

By means of centrifuging or filtering, the two condensation products, which are insoluble under these conditions, and which have melting points of between about 160 and 186° C., are separated off and are re-washed with a little water.

The residue, consisting of the condensation products plus any impurities, is then collected and converted into bis-glycol ester in the autoclave by means of heating together with about 5 to 7 times the theoretical amount of glycol, for about one hour at 230° C.

The filtrate is then cooled, by stirring, to about 10° C. whereby the bis and mono-glycol ester of the terephthalic acid crystallize out in the form of colorless crystals. These crystals are then re-washed with a little cold water and vacuum-dried at about 80° C.

The resulting product is suitable for the preparation of highly satisfactory polymers. It contains about 88.5–90%, by weight, of bis and mono-glycol esters, in which the mono-glycol ester amounts to only about 2%, by weight, the condensation products amount to about 7–9%, by weight, and wherein there is a maximum amount of about 2.5% diglycol ester.

Since the solubility of the bis-glycol ester in water at about 10° C. amounts to only about 0.8%, it is expedient to use the mother liquor obtained by re-pouring the esterification precipitate two or three times. This can be accomplished without any detrimental effect on the quality of the resultant polymer. The mother liquors are saponified by heating for about two hours in the autoclave at 240–250° C. resulting in a precipitation of pure terephthalic acid which is regained by means of filtration.

Obviously many modifications and variations of the present invention are possible in the light of the above teachings. It is, therefore, to be understood that within the scope of the appended claims the invention may be practiced otherwise than as specifically described.

What is claimed is:

1. A process for the production of terephthalic acid glycol ester which comprises reacting terephthalic acid with glycol and at a temperature of between about 210° C. and 250° C., the glycol being added in an amount which is between about four and ten times as great as the theoretical amount necessary to form bis-glycol terephthalate, the addition of the glycol taking place in two steps wherein one portion of the glycol is added for an initial reaction with the terephthalic acid during which water is formed, cooling the reaction products of the initial reaction to a temperature under the boiling point of the glycol, removing said water in the form of steam, adding the second portion of glycol, re-heating the mixture, cooling to a predetermined temperature, distilling off excess glycol, pouring the liquid residue into a water bath at about 80° C., cooling to about 50° C., filtering out one of the resulting condensation products, cooling the mother liquor to about 10° C., at which time the monomeric terephthalic acid glycol ester crystallizes, and finally separating the crystals by filtration.

2. The process of claim 1 wherein about ten times the theoretical amount of glycol is used in the initial reaction.

3. The process of claim 1 wherein the initial reaction takes place at a temperature of between about 240–250° C.

4. The process of claim 1 wherein the ratio of glycol used in the initial reaction in respect to the terephthalic acid is between about 2–2.5 moles glycol to 1 mole terephthalic acid.

5. The process of claim 1 wherein the initial reaction time is about 1½ hours.

6. The process of claim 1 wherein the second reaction temperature is about 220° C.

7. The process of claim 1 wherein the total reaction time is about 3 hours.

8. The process of claim 1 wherein commercial, unpurified terephthalic acid is used in the initial reaction.

9. The process of claim 1 wherein the terephthalic acid-glycol condensation products, formed when the liquid residue is poured into the water bath, are converted to monomeric terephthalic acid glycol ester by heating with an excess of glycol, said glycol being from 5 to 7 times in excess of the theoretical amount necessary for the reaction.

10. The process of claim 1 wherein the mother liquor is heated under pressure for about two hours at a temperature of between 240–250° C. to form free terephthalic acid.

References Cited in the file of this patent

UNITED STATES PATENTS

| 2,465,319 | Whinfield et al. | Mar. 22, 1949 |
| 2,643,989 | Auspos et al. | June 30, 1953 |

OTHER REFERENCES

Shorland: J. Am. Chem. Soc., 57, 115–116 (1935).

UNITED STATES PATENT OFFICE
CERTIFICATE OF CORRECTION

Patent No. 2,855,432                          October 7, 1958

Hans Binder

It is hereby certified that error appears in the printed specification of the above numbered patent requiring correction and that the said Letters Patent should read as corrected below.

Columns 5 and 6, Table 3, twelfth column thereof, eleventh number, for "6.0" read -- 6.7 --; same table, last column, sixth number, for "20.1" read -- 27.1 --.

Signed and sealed this 26th day of May 1959.

(SEAL)

Attest:

KARL H. AXLINE
Attesting Officer

ROBERT C. WATSON
Commissioner of Patents